July 4, 1944.  P. KRAHEL  2,352,721
PARACHUTE AND AUTOMATIC OPENING DEVICE THEREFOR
Filed May 15, 1941  2 Sheets-Sheet 1
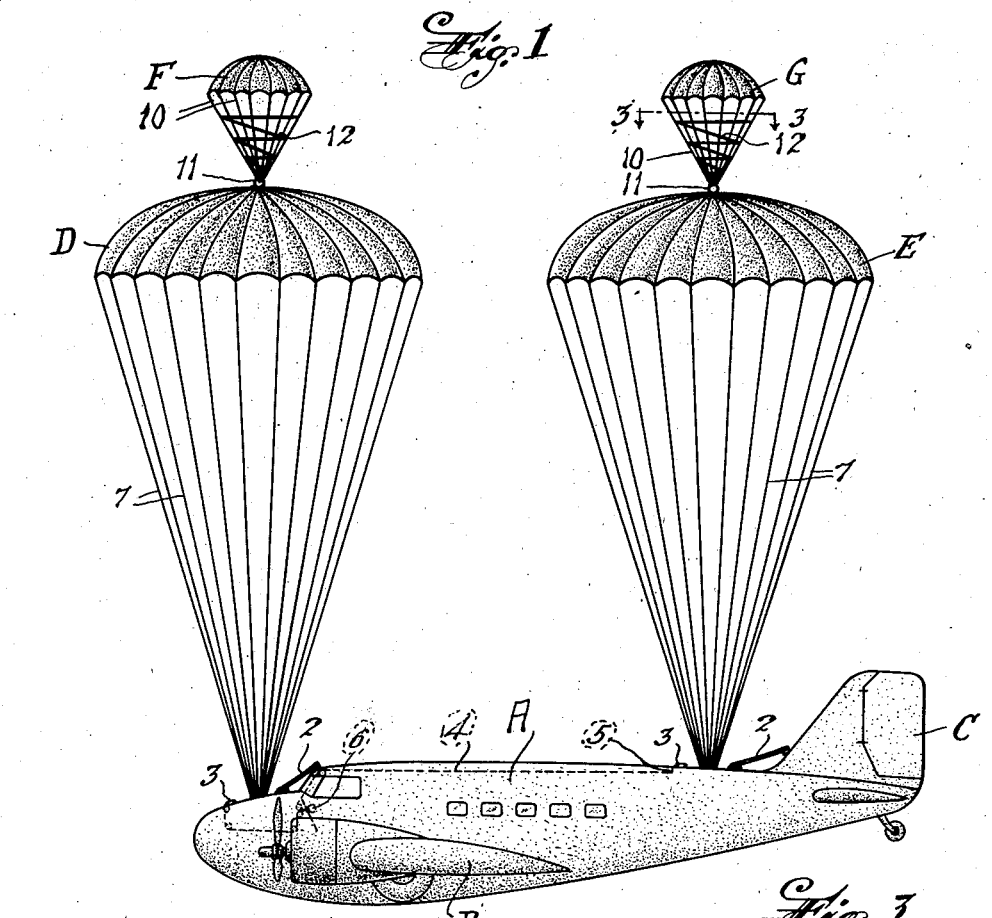
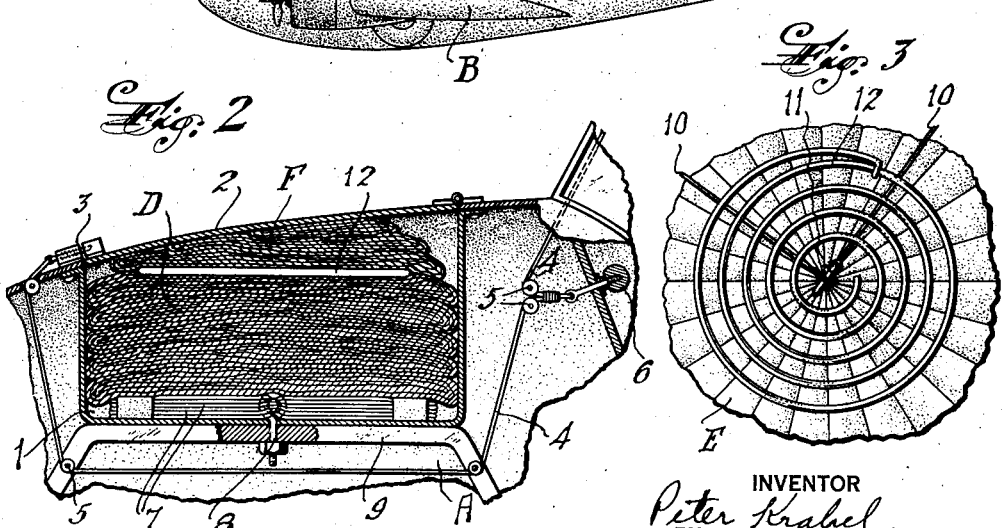
INVENTOR
Peter Krahel,
BY
Harry B. Cook,
ATTORNEY

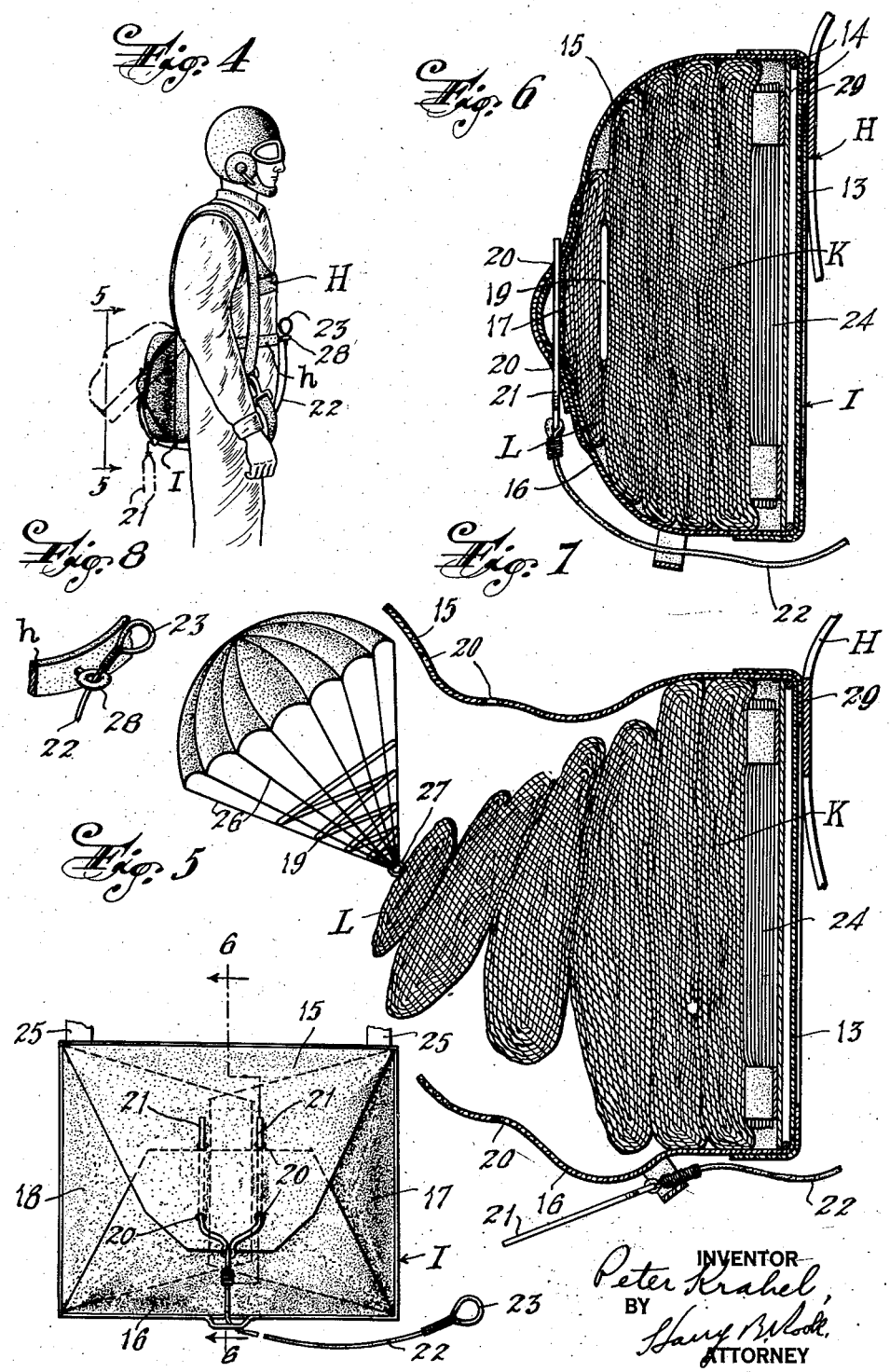

Patented July 4, 1944

2,352,721

UNITED STATES PATENT OFFICE 2,352,721

PARACHUTE AND AUTOMATIC OPENING DEVICE THEREFOR

Peter Krahel, Newark, N. J.

Application May 15, 1941, Serial No. 393,506

3 Claims. (Cl. 244—147)

This invention relates in general to parachute equipment for aeroplanes and pilots and passengers thereof, whereby safe landings may be made in cases of emergency. More particularly, the invention contemplates parachute equipment of the type which includes a main parachute and an auxiliary or pilot parachute for withdrawing the main parachute from a compartment in an aeroplane or the parachute pack of a pilot or passenger to facilitate opening of the main parachute.

A prime object of the invention is to provide a novel and improved combination of a main parachute, an auxiliary parachute and automatic means for projecting the auxiliary parachute from a compartment in an aeroplane or a parachute pack so as to insure rapid opening of the auxiliary parachute and quick withdrawal of the main parachute from said compartment or pack.

As is well known, there is only limited space for the packing and storage of a parachute in an aeroplane or in a parachute pack, and accordingly another object of the invention is to provide an important and improved device for facilitating projection of the auxiliary parachute from the compartment or pack and which shall consume a minimum amount of space when the parachutes are stored in a compartment or parachute pack.

A further object is to provide a novel and improved form of compression spring and a novel and improved combination thereof with a main parachute and an auxiliary parachute whereby said spring can be collapsed or compressed into approximately a flat plane when the parachutes are folded and stored, and which shall expand or open into conical form so as to quickly eject and spread open the auxiliary parachute upon opening of the compartment or pack.

Another object is to provide novel and improved means whereby a parachute pack can be opened automatically by movement of the pack relatively to the body of the person wearing the pack, under influence on the pack of air currents as the person jumps or falls from an aeroplane.

Other objects, results and advantages will appear from the following description when read in conjunction with the accompanying drawings in which Figure 1 is a side elevational view of an aeroplane and parachute equipment therefor embodying my invention, showing the parachute equipment in operation for supporting the aeroplane.

Figure 2 is a fragmentary enlarged longitudinal vertical sectional view through one of the compartments in the body or fuselage of the aeroplane, showing the parachutes folded and stored in the compartment.

Figure 3 is an enlarged horizontal sectional view on the line 3—3 of Figure 1 with the majority of the shroud lines for the auxiliary parachutes omitted for clearness in illustration.

Figure 4 is a perspective view of a parachute pack embodying my invention, showing the pack as worn by a pilot or passenger.

Figure 5 is an enlarged front elevational view of the pack shown in Figure 4 viewing the pack from the line 5—5 of Figure 4.

Figure 6 is an enlarged transverse vertical sectional view on the line 6—6 of Figure 5 showing the parachutes folded and stored in the pack.

Figure 7 is a similar view showing the opening of the pack and the ejection of the auxiliary parachute therefrom, and Figure 8 is a fragmentary perspective view showing the attachment of the rip cord to the harness.

Referring particularly to the form of the invention shown in Figures 1 to 3 inclusive, I have shown an aeroplane of one modern type that includes a body or fuselage A, wings B and rudder C.

Two main parachutes D and E with the respective auxiliary parachutes F and G are shown for landing the aeroplane in cases of emergency. Although one or more parachutes may be utilized, preferably two parachutes are provided to prevent spinning of the aeroplane and for sustaining it in horizontal position for safe landing.

As shown, each main parachute E and its corresponding auxiliary parachute is normally folded and stored in a compartment I within the fuselage or body of the aeroplane, and preferably one compartment is provided at the forward end of the aeroplane, while the other compartment is located at the rear. The compartments open upwardly and have their open ends normally closed by hinged covers 2 that are normally held in closed position by suitable latches 3 which may be simultaneously opened in any suitable manner as by pull cords 4 passing over suitable pulleys 5 and connected to a common handle 6 that is located conveniently to the pilot of the aeroplane, for example on the instrument board. With this construction, by pulling upon the handle 6, the latches 3 of both compartments can be simultaneously released to permit opening of the respective covers 2.

Each main parachute has the usual shroud lines 7 that may be connected to the body or fuselage of the aeroplane in any suitable manner, as by an eyebolt 8 secured in a portion 9 of the frame of the aeroplane. Each auxiliary parachute has its shroud lines 10 that are connected in any suitable manner at a common point as by a swivel 11 to the corresponding main parachute.

The main parachutes should be of such size that together they will be capable of sustaining the aeroplane for a safe landing, and the auxiliary parachutes F and G will be of such size that they are capable of pulling or withdrawing the main parachutes from their compartments 1 and lifting them clear of the aeroplane for opening.

It is highly important that the auxiliary parachutes be instantaneously ejected or projected from their corresponding compartments 1 upon release of the corresponding covers 2 so as to withdraw and cause opening of the main parachutes in ample time to interrupt or retard falling of the aeroplane in case of emergency. For this purpose, I provide a helically coiled conical spring 12 the convolutions of which in plan view are spiral so that the spring may be collapsed or compressed with all of the convolutions in a common flat plane and arranged side-by-side instead of in superposed relation to each other, whereby the spring when collapsed will occupy a minimum of space. Preferably the conical contour of the spring will be such as to approximately conform to the angle of inclination of the shroud lines 10 of the auxiliary parachute from the corresponding swivel 11, as shown in Figure 1. One of the springs 12 will be interposed between each of the main parachutes and the corresponding auxiliary chute and within and surrounded by the shroud lines of the corresponding auxiliary parachute with the convolutions of smallest diameter adjacent the main parachute and concentric with the swivel 11, although other arrangements of the spring will occur to those skilled in the art.

Normally each of the main parachutes will be folded in the usual manner and stored in its corresponding compartment as shown in Figure 2. The corresponding spring 12 will be compressed and the corresponding auxiliary parachute will be folded in the usual manner and deposited in the corresponding compartment 1 in superposed relation to the compressed spring 12 and the main parachute. Then the cover 2 of the corresponding compartment will be closed and latched. With this arrangement, it will be observed that the opening device or spring 12 for the auxiliary parachute occupies a minimum of space so that the compartments 1 may be made of minimum size and of simple structure. Also, the spring 12 will serve to force open the corresponding compartment cover 2 when the latch 3 is released.

In operation, in case of emergency, an occupant of the aeroplane will pull on the handle 6 to release the latches 3 of the compartments, whereupon the springs 12 will project or eject the auxiliary parachutes F and G with a snap action from their respective compartments so that these parachutes will be practically instantaneously opened. Upon opening of the auxiliary parachutes, they will quickly pull or withdraw their corresponding main chutes from the compartments 1 and facilitate rapid opening of the main parachutes, as shown in Figure 1. Thereupon, the aeroplane will be sustained and permitted gradually to descend for a safe landing.

In Figures 4 to 7 inclusive, I have shown the invention as embodied in parachute equipment for pilots or passengers of aeroplanes. The equipment in general is similar to that known in the art and includes the usual harness H for the body to which the pack I for the parachute is connected. This pack includes a body wall 13 of flexible character, for example, fabric, which is generally rectangular in shape and has a wire frame 14 supported therein to maintain the shape of the pack. The pack also includes main side flaps 15 and 16 that are hingedly connected to opposite side edges of the body wall 13, and end walls 17 and 18.

Within the pack is folded and stored the main parachute K and the auxiliary parachute L that may be in general similar to the main parachute E and auxiliary parachute G hereinbefore described, except as to size. An opening device or spring 19 that is substantially identical in construction with the opening device or spring 12, is arranged between the main parachute K and the auxiliary parachute L, and when the two parachutes are folded and stored in the pack, the spring 19 is compressed into substantially a flat plane as shown in Figure 6.

The parachutes are held in this folded position with the spring 19 compressed, by the flaps 15, 16, 17 and 18 that are folded over the parachutes and into overlapping relation to each other as shown in Figures 5 and 6. The overlapping flaps have registering openings 20 that may be lined by grommets and through which the usual prongs 21 of the rip cord 22 are threaded for connecting the flaps together.

The harness H may have a belt portion h provided with an eye 28 at the front, and the rip cord is passed between the legs of the wearer of the parachute pack and threaded upwardly through the eye. The rip cord has a finger piece 23 normally disposed above the eye in convenient location to be grasped by the wearer of the pack as shown in Figure 4, and is of such size that it cannot pull through the eye 28.

The pack I is connected at its upper edge to the harness as at 29, and the lower portion of the pack is free to swing upwardly as shown by dot and dash lines in Figure 4. The length of the rip cord is such that when the pack is swung upwardly as described and the finger piece abuts the eye 28, the prongs 21 will be withdrawn from the openings 20 and disconnect the flaps 15 to 18 from each other as shown in Figure 7.

Obviously when the prongs 21 are so withdrawn, the spring 19 will immediately expand so as to throw the flaps apart and eject or project the auxiliary parachute L with a snap action outwardly from the pack as shown in Figure 7. The air currents will then act upon the auxiliary parachute to pull the main parachute K from the pack in a manner similar to that in which the auxiliary parachute F or G withdraws its corresponding main chute D or E from the corresponding compartment 1 of the aeroplane.

It will be observed that with this construction, the parachute pack may be opened manually by a pull on the finger piece 23 of the rip cord. Also, the pack will be opened automatically if the wearer jumps or falls from an aeroplane, the air currents incident to the fall causing the pack to be swung upwardly as shown in dotted lines in Figure 4 so as to pull the prongs 21 from the openings 20 as above described.

It will be understood by those skilled in the art that the shroud lines 24 of the main parachute will be connected to the suspension lines 25, and that said suspension lines will be connected to the harness H in the usual manner. The shroud lines 26 of the auxiliary parachute may be connected to the main parachute, for example, by a swivel 27.

With my invention, it will be seen that the particular combination of main parachute and auxiliary parachute with the opening device or spring 12 or 19, assures instantaneous and complete opening of the auxiliary parachute and consequent rapid and complete opening of the corresponding main parachute. The opening device or spring adds only slightly to the bulk of the parachute equipment and is simple and inexpensive to manufacture and combine with the two parachutes. Also, the opening device serves as a positive means for both opening the closures of the aeroplane compartments or the parachute pack and to positively and instantaneously eject or project the auxiliary parachute into operative position.

While I have shown and described the invention as embodied in certain details of construction, it should be understood that this is primarily for the purpose of illustrating the principles of the invention, and that the specific details of structure of the opening device and the combination thereof with different types of parachutes may be varied by those skilled in the art without departing from the spirit or scope of the invention.

Having thus described my invention, what I claim is:

1. Parachute equipment comprising a container having a parachute therein and a closure including overlapping closure flaps formed with registering openings, releasable means for holding said flaps in closed position and including a prong slidably threaded through said openings and a rip cord connected to said prong, a harness for mounting said container on a person, means connecting said container to said harness to permit free swinging of said container normally upwardly and outwardly and rearwardly from the person, said rip cord extending forwardly and between the legs of the person, and a loop on the front of said harness through which said rip cord is slidable, said rip cord having a handle at the side of said loop opposite said prong and incapable of passing through said loop, whereby said cord is connected to harness with said closure flaps normally held closed by said releasable holding means so that the person may pull said cord to slide said prong out of said openings to permit opening of said closure or said prong will be pulled from said openings by tension exerted upon said rip cord upon movement of said container relatively to said person during falling of the latter.

2. Parachute equipment comprising a container having a releasable closure, releasable means including a rip cord for holding said closure in closed position, a harness for mounting said container on a person, said container being connected to said harness for movement relatively thereto under influence of air currents incident to falling of said person, a loop on the front of said harness through which said rip cord is slidable, said rip cord having a handle at the side of said loop opposite said releasable holding means and incapable of passing through said loop, whereby said cord is connected to harness with said closure normally held closed by said releasable holding means so that the person may pull said cord to actuate said holding means and permit opening of said closure or said holding means will be actuated by tension exerted upon said cord by movement of said container relatively to said harness during falling of the person.

3. Parachute equipment comprising a container having a releasable closure and means for normally releasably holding the closure in closed position, a main parachute collapsed within said container, means for connecting said container and parachute to a load, a pilot parachute collapsed within said container in superposed relation to said main parachute and having shroud lines connected thereto and also connected at a common point to said main parachute, and a helically coiled conical compression spring the convolutions of which in plan view are spiral so that the spring may be compressed with all of its convolutions approximately in a common flat plane, said spring being arranged within and surrounded by said shroud lines and normally so compressed and interposed between said pilot parachute and said main parachute, the smallest convolution of said spring being disposed at and concentric with said point of connection of said shroud lines with said main parachute so that the spring as it extends serves to project said pilot chute from said container, said spring when extended having a diameter and conical contour to conform to the angle of inclination of said shroud lines from said point of connection when the pilot chute is fully projected, so that as the spring extends, its convolutions engage and hold said shroud lines in spaced relation to each other.

PETER KRAHEL.